(Model) 2 Sheets—Sheet 1.
H. P. TENANT.
SEED SOWER AND FERTILIZER DISTRIBUTER.
No. 250,299. Patented Nov. 29, 1881.
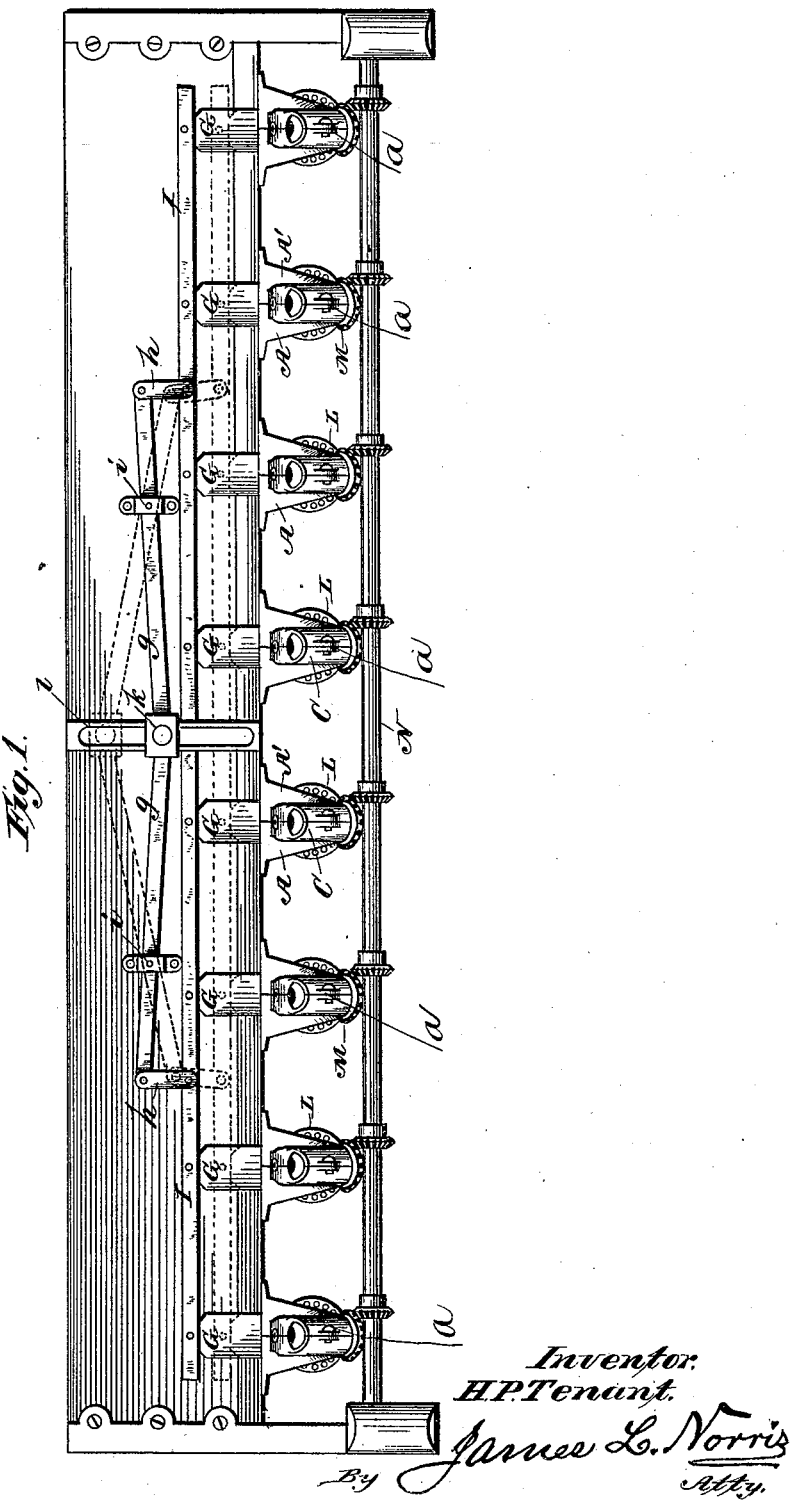
Witnesses.
Robert Everett
A. H. Norris
Inventor:
H. P. Tenant.
By James L. Norris
Atty.

(Model.)
H. P. TENANT.
SEED SOWER AND FERTILIZER DISTRIBUTER.
No. 250,299.  Patented Nov. 29, 1881.
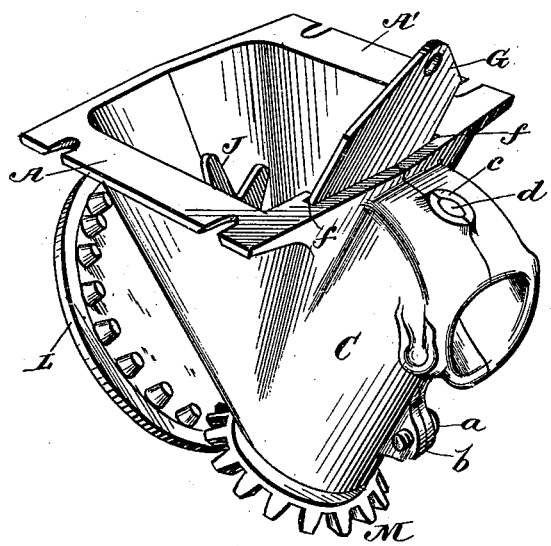
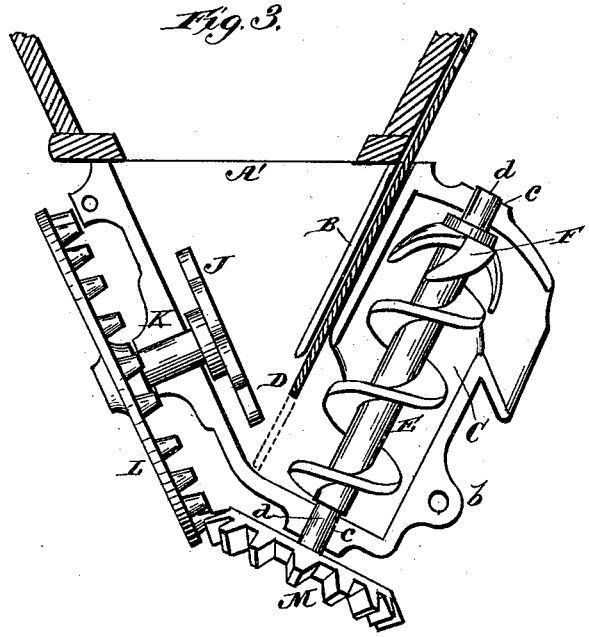
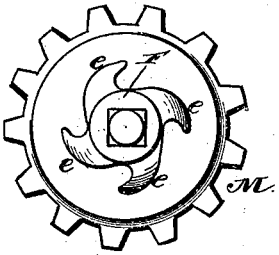
Witnesses.
Robert Everett,
A. H. Norris.
Inventor
H. P. Tenant,
By James L. Norris.
Atty

UNITED STATES PATENT OFFICE.

HANSON P. TENANT, OF RICHMOND, INDIANA, ASSIGNOR OF ONE-HALF TO GAAR, SCOTT & CO., OF SAME PLACE.

SEED-SOWER AND FERTILIZER-DISTRIBUTER.

SPECIFICATION forming part of Letters Patent No. 250,299, dated November 29, 1881.

Application filed August 29, 1881. (Model.)

*To all whom it may concern:*

Be it known that I, HANSON P. TENANT, a citizen of the United States, residing at Richmond, in the county of Wayne and State of Indiana, have invented new and useful Improvements in Machines for Sowing Grain and Distributing Fertilizing Materials, of which the following is a specification.

This invention relates to improvements in the seeding-machine for which I have heretofore filed an application for Letters Patent, in which machine the seed cup or case is provided with a feed tube or passage communicating therewith at or near its lower portion, said feed-tube containing a worm or other suitable mechanism for continuously carrying the grain from the seed cup or case toward the upper end of the feed-tube, where it is discharged into a tube leading to the drill-tooth.

The objects of my present invention are, first, to provide the seed cups or cases with simple and efficient means for controlling or governing the supply of grain or other material from the seed cup or case to the feeding mechanism in the feed-tube; second, to prevent clogging or banking of the grain or other material at the upper end of the feed-tube, and insure the uniform lateral discharge of the grain or other material from the feed-tube; and, third, to provide the seed cups or cases with simple and efficient means whereby they are adapted to distribute the ordinary fertilizing material. These objects I attain by the mechanism illustrated in the accompanying drawings, in which—

Figure 1 is a view looking from the rear of the machine, to illustrate the series of seed-cups, their cut-offs or slides, and the manner of operating the feeding devices and agitators; Fig. 2, a perspective view of one of the seed cups or cases detached; Fig. 3, a vertical central sectional view through one of the seed cups or cases, and Fig. 4 is a detached view of the agitator on the worm or conveyer.

Similar letters of reference indicate corresponding parts in the several figures.

The seed cup or case and the feed-tube are constructed substantially in the manner described and shown in my former application for a patent—that is to say, in two sections, A A', joined or connected together by bolts $a$, passing through perforated ears $b$, formed on each section, as clearly shown in Fig. 2, and adapted to be attached to the under side of the ordinary hopper in a suitable manner—for instance, by screws or bolts.

The seed cup or case is formed with a rear wall, B, which separates its chamber from the feed-tube C, except at or near the bottom portion, where an opening or passage, D, is left, which affords communication between the cup and the feed-tube. The dividing-wall B, as well as the feed-tube, is shown as arranged obliquely to a vertical line through the seed cup or case, and the discharge orifice or mouth of the feed-tube is at the upper end thereof.

In the top and bottom walls of the feed-tube are provided suitable bearings, $c$, in which rotate the journals $d$ on the ends of the worm or conveyer E. This arrangement is the same, or substantially the same, as in my former invention; but in order to prevent clogging, banking, or accumulation of the grain or other material at the discharge mouth or orifice of the feed-tube, and to insure a uniform and positive discharge of the grain or other material laterally through said discharge mouth or orifice, I arrange upon the upper portion of the worm or conveyer E an agitator, F, which rotates with the latter and is furnished with a series of depending arms or fingers, $e$, which are uniformly curved downward and are inclined laterally, so that as they travel around in the upper portion of the feed-tube they sweep or throw the grain outward through the discharge mouth or orifice, and thereby provide an efficient and simple means for positively forcing or ejecting the grain or other material through the discharge mouth or orifice.

The rear wall of the seed cup or case is provided with parallel grooves or guides $f\,f$, in which is arranged to move the cut-off or slide G, which rests upon the dividing-wall B of the seed cup and is capable of sliding downward for adjusting the area of the opening or passage D between the seed-cup and the feed-tube. The cut-off or slide can be moved downward within the chamber of the seed-cup until its lower edge rests against the front wall of the same, in which event the supply of seed to the worm or conveyer is wholly cut off, or it can be moved to any intermediate position over the said opening or passage, and thereby govern and control the amount of seed or other material which is supplied to the worm or conveyer.

Each seed-cup of the series is furnished with its individual cut-off or slide, and this system of cut-offs or slides is connected with a mechanism common to all, whereby they can all be simultaneously adjusted in their respective seed-cups or cases. In the example illustrated in the drawings this operative mechanism consists of a horizontal bar, I, at the rear of the hopper, to which the upper ends of the cut-offs or slides are attached, either directly, as shown, or through the medium of connecting-links. The horizontal bar is capable of being raised and lowered by means of two vertically-swinging rods, g g, connected at their outer ends to the bar by pivoted links h h, said rods being pivoted intermediate of their lengths to the hopper, as at i i, and the adjacent ends being connected with an operating knob or handle, k, which can be moved vertically in a guide, l. This operating knob or handle is composed of a nut, which can be screwed up to clamp the adjacent ends of the rods g in their adjusted position upon the guide l, and at one side of the latter is arranged a vertical scale for indicating the proper adjustment of the cut-offs or slides. By moving the knob or handle k upward to the position shown by dotted lines in Fig. 1 the cut-offs or slides will be thrown downward to the bottom of the seed-cup and close the opening or passage between the latter and the feed-tube, while by intermediate adjustments of the knob or handle the area of the said opening or passage can be changed or covered or partially covered, as desired, and thus the supply of seed or material to the feed-tube can be accurately and nicely governed and controlled.

It will be observed that in this arrangement the seed-cups project beyond the rear wall of the hopper, as more clearly seen in Fig. 3, to permit the efficient operation of the cut-offs or slides and their proper connection with the mechanism for adjusting them. I would state, however, that although I have specifically described one mode of operating the system of cut-offs or slides, I do not limit myself to that shown and described, as other means will readily suggest themselves for accomplishing the same object, the essential features of this part of my invention consisting in the arrangement of the cut-offs or slides directly within the chambers of the seed-cups themselves, whereby I am enabled to provide a means for more accurately adjusting the slides to supply a given quantity of seed or other material to the feeding mechanism than is practicable where a cut-off or slide is arranged within the seed-hopper to control a passage leading from the hopper to the seed-cup.

I would also state that I do not confine myself to the cut-offs or slides moving vertically in grooves, as shown, as they might be made to swing on a pivot, the essential feature being their arrangement and location within the chambers of the seed-cups to control a passage therein which communicates with the feeding mechanism.

In order to adapt the seed cup or case for distributing fertilizing material, I arrange within the same an agitator, J, which, in the example shown, consists of a star or armed wheel mounted on an inclined shaft or arbor, K, which rotates in suitable bearings and projects through the seed cup to the exterior thereof, its outer end being furnished with a face or crown wheel, L, meshing with the beveled pinion M on the lower journal of the worm or conveyer E, by which arrangement motion is imparted to the agitator by the rotation of the beveled pinion M, which latter is operated by pinions on the driving-shaft N.

The star or armed wheel J rotates adjacent to the opening or passage D, and in a plane parallel to the rear wall of the seed cup or case, and its function is to loosen the fertilizing material or prevent its clogging or accumulating in the seed cup or case, and at the same time direct such material to the worm or conveyer, and practically keep the seed-cup free and provide a uniform and continuous flow of the material to the feeding mechanism in a manner much more efficient and practical than where an agitator is arranged in a hopper to agitate the same prior to its passage to the feeding mechanism.

Having thus described my invention, what I claim is—

1. The combination, with a cup or case, a feed-tube communicating therewith at or near its bottom and arranged in an upright or oblique position relative to said cup or case, and mechanism arranged in said tube for continuously conveying the grain or other material discharged therein from the cup or case toward the upper end of said tube, of a cut-off or slide arranged within the cup or case for controlling the communication between the latter and the lower portion of the feed-tube to govern the supply of grain or other material to the said feeding mechanism therein, substantially as described.

2. The combination, with a cup or case, a feed-tube communicating therewith at or near its bottom and arranged in an upright or oblique position relative to said cup or case, and a feed-worm arranged in said feed-tube for continuously elevating the grain from the cup or case to the upper end of the feed-tube, of a cut-off or slide arranged within the cup or case, and controlling the communication between the latter and the lower portion of the feed-tube to govern the supply of grain or other material to the said feed-worm, all substantially as described.

3. A seed cup or case provided at its sides with guide-grooves and at or near its lower portion with an opening or passage leading to a feed-tube which is provided with an elevated discharge-mouth and means for feeding the grain or other material through said feed-tube, in combination with a sliding cut-off arranged within the guide-grooves in the cup or case, and capable of being adjusted upward or downward in said guide-grooves for controlling the opening or passage between the feed-tube and the cup or case.

4. The combination, with a cup or case provided with an upright or inclined feed-tube having a discharge-mouth at or near the top of the cup or case, and in communication with the latter at or near the bottom thereof, of means for elevating the grain or other material in said feed-tube and an agitator arranged adjacent to the elevated discharge-mouth of the feed-tube for forcing the grain or other material laterally through the same.

5. The combination, with a cup or case, a feed-tube communicating therewith and having a discharge mouth or orifice at or near its top, and a rotating worm or conveyer arranged within the feed-tube, of a rotary agitator arranged above the worm or conveyer adjacent to the discharge mouth or orifice of the seed-tube.

6. The combination, with the cup or case, the feed-tube, and the worm or conveyer, of the agitator at the upper end of the worm or conveyer, consisting of depending curved arms arranged to sweep or throw the grain or other material laterally through the discharge mouth or orifice of the feed-tube.

7. The combination, with a cup or case arranged below a hopper and provided with a feed-tube containing feeding mechanism, and having an elevated discharge-mouth and a receiving-mouth in communication with the lower portion of the cup or case, of an agitator arranged within the said cup or case adjacent to the opening therein which communicates with the feed-tube, substantially as described.

8. The combination, with the cup or case, the upright or inclined feed-tube, having an elevated discharge-mouth and a receiving-mouth at the lower portion of the seed cup or case, and a worm or conveyer rotating in said feed-tube, of an armed rotary agitator arranged within the cup or case, and rotated by a shaft which projects through the latter and is operated by the main driving-shaft, substantially as described.

9. The agitator arranged within the cup or case, in combination with a shaft extending through the latter, a face or crown wheel on the outer end of said shaft, a pinion connected with the feeding mechanism in the cup or case and meshing with said face or crown wheel, and the driving-shaft having a pinion operating the feeding mechanism.

In testimony whereof I have hereunto set my hand in the presence of two subscribing witnesses.

HANSON P. TENANT.

Witnesses:
E. H. DENNIS,
M. E. McMEANS.